United States Patent [19]

Trautner et al.

[11] 4,145,342
[45] Mar. 20, 1979

[54] NITRO-DIPHENYLAMINO-AZO-PHENYL DYESTUFFS CONTAINING A POLYALKYENEOXY GROUP

[75] Inventors: Kersten Trautner, Cologne; Karl H. Schündehütte, Leverkusen, both of Fed. Rep. of Germany

[73] Assignee: Bayer Aktiengesellschaft, Leverkusen, Fed. Rep. of Germany

[21] Appl. No.: 813,314

[22] Filed: Jul. 6, 1977

[30] Foreign Application Priority Data

Jul. 9, 1976 [DE] Fed. Rep. of Germany ....... 2630988

[51] Int. Cl.² .................... C09B 43/00; C09B 43/18
[52] U.S. Cl. .................... 260/207; 260/152; 260/154; 260/156; 260/205; 260/206; 260/207.1; 260/207.5
[58] Field of Search ............ 260/205, 206, 207, 207.1, 260/207.5, 152, 156, 154

[56] References Cited

U.S. PATENT DOCUMENTS

| 2,077,322 | 4/1937 | Hatt | 260/206 |
| 2,118,088 | 5/1938 | Knight et al. | 260/207.5 |
| 2,191,040 | 2/1940 | McNally et al. | 260/206 X |
| 2,241,247 | 5/1941 | Dickey | 260/206 |
| 2,843,580 | 7/1958 | Straley et al. | 260/206 X |
| 2,879,269 | 3/1959 | Merian | 260/206 X |
| 3,516,982 | 6/1970 | Dimroth et al. | 260/206 |
| 3,522,235 | 7/1970 | Baron et al. | 260/207 |
| 3,535,306 | 10/1970 | Altermatt et al. | 260/206 X |
| 3,663,531 | 5/1972 | Liechti | 260/206 |
| 3,883,503 | 5/1975 | Van Assche et al. | 260/206 |

FOREIGN PATENT DOCUMENTS

1265505 5/1961 France .................. 260/206 X

Primary Examiner—Charles F. Warren
Attorney, Agent, or Firm—Plumley and Tyner

[57] ABSTRACT

Disperse dyestuffs of the formula

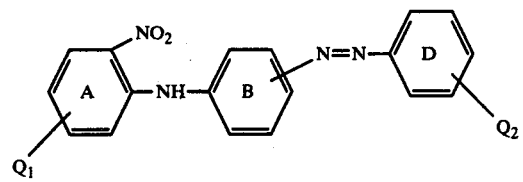

wherein $Q_1$ and $Q_2$ are hydrogen or the group V-(A-O)$_n$Z, but do not at the same time represent hydrogen, A — denotes an alkylene group, V — denotes a direct bond or a bridge member, Z — denotes hydrogen, alkyl, aryl, aralkyl or acyl and n — denotes an integer from 2–10 and the rings A, B and D can be further substituted.

The dyestuffs are suitable for dyeing polyester fibres from an aqueous liquor by the exhaustion process since they are distinguished by a good affinity and build-up power. The dyeings are very clear and display good general fastness properties, such as fastness to light, sublimation and measuring.

7 Claims, No Drawings

NITRO-DIPHENYLAMINO-AZO-PHENYL DYESTUFFS CONTAINING A POLYALKYENEOXY GROUP

The invention relates to nitroaminoazo dyestuffs which are free from sulphonic acid groups and of the formula

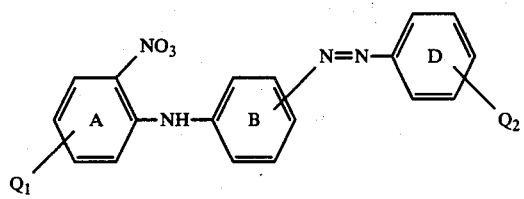

wherein
$Q_1$ and $Q_2$ independently of one another represent hydrogen or the group $V\text{-}(A\text{-}O)_nZ$, but do not at the same time represent hydrogen,
A denotes an alkylene group,
V denotes a direct bond or a bridge member,
Z denotes hydrogen, alkyl, aryl, aralkyl or acyl and
n denotes an integer from 2–10 and the rings A, B and D can contain further non-ionic substituents customary in azo dyestuff chemistry, such as, for example, halogen or alkyl, nitro, alkoxy, carboxyl or ester groups and carboxyl groups esterified with polyether chains, and the azo group is in the m-position or p-position to the secondary amino group on ring B,
as well as their preparation and use.
Preferred dyestuffs correspond to the formula

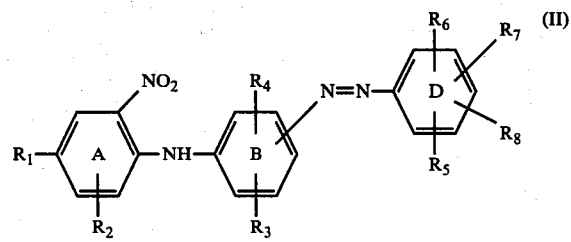

wherein
$R_1$ represents H, $NO_2$, CN, halogen, alkyl, $COX_1$, $SO_2X_2$, $CONX_3X_4$, $SO_2\text{-}NRX_3X_4$, COOZ, SCN, $OX_1$, $SX_1$ or $V\text{-}(A\text{-}O\text{-})_mZ$, $R_2$ represents H, $NO_2$, halogen, alkyl, O-alkyl or aryl,
$R_3$, $R_4$ and $R_5$ independently of one another represent H, alkyl, O-alkyl or halogen,
$R_6$ represents H, alkyl, aryl or cycloalkyl,
$R_7$ represents H, $V\text{-}(A\text{-}O\text{-})_mZ$ or V-Z and
$R_8$ represents H, $V\text{-}(A\text{-}O\text{-})_mZ$ or V-Z and
$X_1$ denotes alkyl or aryl,
$X_2$ denotes alkyl, aryl or aralkyl,
$X_3$ and $X_4$ independently of one another denote H, alkyl, aryl or cycloalkyl, or, conjointly with the N atom, form a 5-membered to 7-membered saturated heterocyclic structure and
Z denotes H, alkyl, aryl, aralkyl or cycloalkyl,
m denotes an integer 2–8 and
V and A have the abovementioned meaning and the abovementioned alkyl, aryl, aralkyl or cycloalkyl radicals can contain further non-ionic substituents customary in dyestuff chemistry,
with the proviso that the azo group is in the m-position or o-position relative to the secondary amino group on ring B and that at least one of the radicals $R_1$, $R_7$ and $R_8$ independently of one another represent the radical $V\text{-}(A\text{-}O\text{-})_mZ$.

Within the scope of this invention, alkylene groups are to be understood as those with 2 to 8 C atoms, such as, for example, $-CH_2-CH_2-$, $$-CH_2-\underset{CH_3}{CH}-\text{ or }-\underset{CH_3}{CH}-CH_2-.$$

Suitable bridge members V are $-NY-C_2H_4-$,

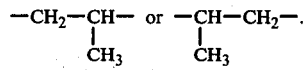

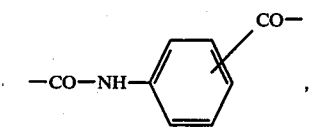

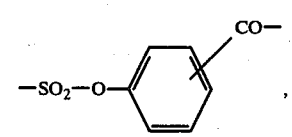

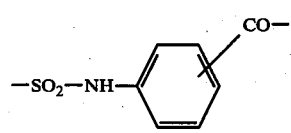

$-O-$, $-S-$, $-NY-$, $-COO-$, $-O-CO-O-$, $-CO-NH-$, $-NH-CO-NH-$, $-O-CO-NH-$ and $-SO_2-NH-$ and of these $-O-$ and $-COO-$ are preferred; in these formulae Y denotes H or alkyl.

Suitable alkyl radicals $R_1$ to $R_6$ and Y are those which have 1 to 4 C atoms and are preferably unsubstituted.

Suitable alkyl radicals $X_1$ to $X_4$ and Z are those which have 1 to 8 C atoms and can be further substituted by halogen, cyano, hydroxyl, $C_1\text{-}C_4$-alkoxy or acyloxy, and acyloxy is to be understood as $C_1\text{-}C_4$-alkylcarbonyl or benzoyloxy.

Suitable aryl $R_2$, $R_6$, $X_1$ to $X_4$ and Z is phenyl, which is optionally monosubstituted or disubstituted by $C_1\text{-}C_4$-alkyl, $C_1\text{-}C_4$-alkoxy, halogen, such as fluorine, chlorine or bromine, cyano or nitro.

Suitable cycloalkyl $R_6$, $X_3$ to $X_4$ and Z is cyclopentyl, cyclohexyl and cycloheptyl.

Suitable alkyl radicals $R_2$ to $R_5$ are those with 1–4 C atoms.

Suitable aralkyl $X_2$ and Z are phenyl-$C_1\text{-}C_4$-alkyl radicals which can be monosubstituted to trisubstituted in the phenyl nucleus by $C_1\text{-}C_4$-alkyl, $C_1\text{-}C_4$-alkoxy, halogen (such as fluorine, chlorine or bromine) or nitro.

Suitable heterocyclic structures which are formed by $X_3$ and $X_4$ with the inclusion of the N atom of the carboxamide or sulphonamide group are pyrrolidine, piperidine and morpholine. However, the new dyestuffs preferably do not contain any heterocyclic structures.

In this invention halogen is understood as fluorine, bromine or, preferably, chlorine.

Preferred dyestuffs are those of the formula (II), wherein
$R_1$ represents $COO-(C_2H_4-O-)_mZ$ or COOZ,
$R_2$ represents H, halogen or alkyl, $R_3$ and $R_8$ represent H, $R_4$ and $R_5$ independently of one another represent H, alkyl, O-alkyl or halogen, $R_6$ represents H, alkyl, aryl or cycloalkyl and $R_7$ represents $O-(C_2H_4-O-)_mZ$ or V-Z and Z denotes H, alkyl, aryl, aralkyl or cycloalkyl and m has the abovementioned meaning and the abovementioned alkyl, aralkyl, aryl or cycloalkyl radicals can contain further non-ionic substituents customary in dyestuff chemistry, such as, for example, have been mentioned above, with the proviso that the azo group is in the m-position or p-position on ring B relative to the secondary amino group and the radical $R_7$ is in the o-position or p-position relative to the azo group and that at least one of the radicals $R_1$ and $R_7$ contains the group $(C_2H_4O)_m$.

Amongst these dyestuffs, those of the formula (II) wherein $R_1$ represents $COO-(C_2H_4-O-)_mZ$ or COOZ, $R_2$ represents H, chlorine or $C_1-C_4$-alkyl, $R_3$ and $R_8$ represent H, $R_4$ and $R_5$ independently of one another represent H, $C_1-C_4$-alkyl, $C_1-C_4$-alkoxy or chlorine, $R_6$ represents H, $C_1-C_4$-alkyl, phenyl, tolyl or cyclohexyl, $R_7$ represents $O-(C_2H_4-O-)_mZ$ or O-Z, m has the abovementioned meaning and Z denotes H, phenyl, phenyl-$C_1-C_4$-alkyl, tolyl, cyclohexyl, $C_1-C_8$-alkyl or $C_1-C_8$-aryl which is substituted by hydroxyl or phenyl, especially methyl, ethyl, propyl, butyl, pentyl, hexyl, heptyl, octyl or 2-hydroxyethyl, as well as the radical

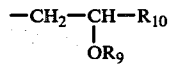

in which $R_9$ denotes H, $C_1-C_4$-alkyl, $C_1-C_4$-alkoxycarbonyl or benzoyl and $R_{10}$ denotes H or $C_1-C_4$-alkyl, with the proviso that the azo group is in the m-position or p-position on ring B relative to the secondary amino group, that the radical $R_7$ is in the o-position or p-position relative to the azo group and that at least one of the radicals $R_1$ and $R_7$ contains the group $(C_2H_4O)_m$, are particularly preferred.

Dyestuffs which are very particularly preferred are those of the formula (II) wherein $R_1$ represents $COO-(C_2H_4-O-)_mZ$ or COOZ, $R_2$, $R_3$, $R_4$ and $R_8$ represent H, $R_5$ represents H, methyl, chlorine, methoxy or ethoxy, $R_6$ represents H, methyl, ethyl, propyl, isopropyl, tert.-butyl, phenyl or cyclohexyl, $R_7$ represents $O-(C_2H_4-O-)_mZ$ or O-Z and m has the abovementioned meaning and Z independently of one another denotes H, methyl, ethyl, n-propyl and isopropyl, butyl, pentyl, hexyl, benzyl, phenyl, tolyl, cyclohexyl, 2-hydroxyethyl, 2-methoxyethyl, 2-ethoxyethyl, 2-acetoxyethyl, 2-hydroxypropyl, 2-hydroxy-3-chloropropyl or 2-methoxybutyl, with the proviso that the azo group is in the p-position on ring B relative to the secondary amino group, that $R_7$ is in the o-position or p-position relative to the azo group and that at least one of the radicals $R_1$ or $R_7$ contains the group $(C_2H_4O)_m$.

Further preferred dyestuffs are those of the formula (II), and the preferred types derived therefrom, wherein $R_1$ represents H, $NO_2$ or CN, $R_2$ represents halogen (preferably chlorine), $NO_2$ or $C_1-C_4$-alkoxy, $R_7$ represents $O-(C_2H_4-O-)_mZ$ or O-Z, $R_8$ represents $COO-(C_2H_4-O-)_mZ$ or COOZ and the other radicals and m have the abovementioned meaning, with the proviso that the azo group is in the m-position or p-position on ring B relative to the secondary amino group, that the radical $R_7$ is in the o-position or p-position relative to the azo group and that at least one of the radicals $R_7$ and $R_8$ contains the group $(C_2H_4O)_m$.

"Bulky radicals", such as, for example, tert.-butyl, are preferably in those positions where they do not effect any steric hindrance.

The dyestuffs can be prepared by various processes. One process for the preparation of the dyestuffs of the formula (I) consists in diazotising amines of the formula

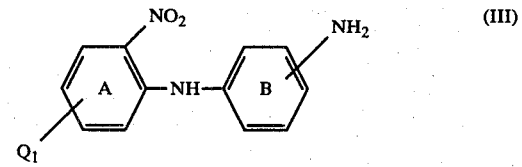

wherein $Q_1$, A and B have the abovementioned meaning and the amino group on the ring is in the p-position or m-position relative to the secondary amino group, and coupling the diazo compound with compounds of the formula

wherein

D has the abovementioned meaning, and subsequently, if desired, converting the phenolic OH group and/or a carboxyl group which may be present in nucleus D in a manner which is in itself known into the radical $Q_2$, which has the above meaning.

A further process for the preparation of the dyestuffs of the formula (I) consists in subjecting an aminoazo dyestuff of the formula

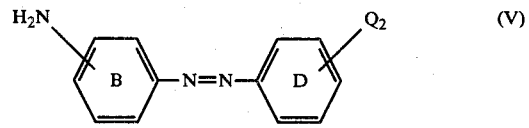

wherein

B, D and $Q_2$ have the abovementioned meaning and the amino group on ring B is in the m-position or o-position relative to the azo group, to a condensation reaction with an o-nitrohalogenobenzene of the formula

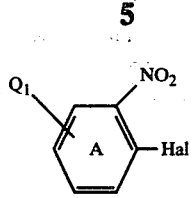

wherein

A and $Q_1$ have the abovementioned meaning and Hal represents bromine or, in particular, chlorine.

Examples of suitable diazo components of the formula (III) are: 2-nitro-4'-aminodiphenylamine, 2-nitro-4-cyano-4'-amino-diphenylamine, 2,4-dinitro-5-chloro-4'-aminodiphenylamine, 2-nitro-3,5-dichloro-3'-aminodiphenylamine, 2-nitro-4-benzoyl-4'-methoxy-3'-aminodiphenylamine, 2-nitro-4-butyryl-3'-methoxy-4'-aminodiphenylamine, 2-nitro-4-benzylsulphonyl-4'-aminodiphenylamine, 2-nitro-4-(2-hydroxyethyl)-sulphonyl-3'-methyl-4'-aminodiphenylamine, 2-nitro-4-n-butylamino-carbonyl-4'-aminodiphenylamine, 2-nitro-4-di-n-propyl-aminocarbonyl-4'-aminodiphenylamine, 2-nitro-4-N-methyl-N-phenylethylaminocarbonyl-4'-amino-diphenylamine, 2-nitro-4-pyrrolidin-1-yl-carbonyl-4'-methoxy-3-aminodiphenylamine, 2-nitro-4-N-phenyl-N-methyl-aminocarbonyl-4'-aminodiphenylamine, 2-nitro-4-di-(2-cyanoethyl-)aminocarbonyl-4'-aminodiphenylamine, 2-nitro-4-methoxycarbonyl-4'-methoxy-3'-aminodiphenylamine, 2-nitro-4-isopropoxycarbonyl-4'-aminodiphenylamine, 2-nitro-4-n-octyloxycarbonyl-4'-methyl-3'-amino-diphenylamine, 2-nitro-4-(2-methoxyethyl)-carbonyl-4'-aminodiphenylamine, 2-nitro-4-(2-hydroxyethyl)-carbonyl-4'-aminodiphenylamine, 2-nitro-4-phenoxycarbonyl-3'-chloro-4'-aminodiphenylamine, 2-nitro-4-cyclohexyloxycarbonyl-4'-aminodiphenylamine, 2,6-dinitro-4'-aminodiphenylamine, 2-nitro-4-carboxy-4'-aminodiphenylamine, 2-nitro-4-carboxy-3'-aminodiphenylamine, the 4'-aminodiphenylamine-4-carboxylic acid ester of hexaethylene glycol monomethyl ether, the 4'-aminodiphenylamine-4-carboxylic acid half-ester of tetraethylene glycol, the 4'-amino-diphenylamine-4-carboxylic acid half-ester of diethylene glycol, 4-(4'-aminophenyl)-3-nitro-benzenesulphonic acid N-(2-carboxyphenyl)-amide and 4-(4'-aminophenyl)-3-nitrobenzenesulphonic acid (3-methoxycarbonyl)-phenyl ester.

Examples of coupling components (IV) which may be mentioned are: phenol, o-, m- and p-cresol, 2-hydroxy-1-tert.butylbenzene, 2-hydroxy-1,4-dimethylbenzene, 1-hydroxy-2-methoxybenzene, 1-hydroxy-3-methoxybenzene, 2-chlorophenol, 2-hydroxybiphenyl, 4-hydroxybenzoic acid methyl ester, 4-hydroxy-benzoic acid n-propyl ester, 2-hydroxy-benzoic acid isobutyl ester, 2-hydroxybenzoic acid iso-pentyl ester, 2-hydroxybenzoic acid phenyl ester, 3-hydroxybenzoic acid ethyl ester, 3-hydroxybenzoic acid 2-ethoxy-ethyl ester, 2-hydroxy-6-methylbenzoic acid methyl ester, 2-hydroxy-4-methyl-benzoic acid p-tolyl ester, 2-hydroxy-benzoic acid 2-hydroxy-ethyl ester, 2-hydroxy-benzoic acid 2-methoxy-ethyl ester, 2-hydroxy-benzoic acid n-octyl ester, 2-hydroxy-benzoic acid 2-acetoxy-ethyl ester, 3-hydroxybenzoic acid benzyl ester, 4-hydroxy-benzoic acid n-pentyl ester, 4-hydroxybenzoic acid n-pentyl ester, 4-hydroxybenzoic acid 2-hydroxy-ethyl ester, 4-hydroxybenzoic acid 2-methoxy-ethyl ester, 3-hydroxy-benzoic acid phenyl ester, the 2-hyroxybenzoate of diethylene glycol mono-n-butyl ether, the 2-hydroxybenzoate of hexaethylene glycol monomethyl ether, the 4-hydroxybenzoate of diethylene glycol monoethyl ether and the 3-hydroxybenzoate of tetraethylene glycol monomethyl ether.

Examples of substances which are suitable for alkylating the phenolic OH group in ring D are: alkylene oxides, such as ethylene oxide, propylene oxide, epichlorohydrin and 1,2-butylene oxide; alkyl halides, such as methyl chloride, ethyl bromide, butyl chloride, octyl bromide, benzyl chloride, 2-ethoxy-2'-chloro-diethyl ether, diethylene glycol monomethyl mono-(2-chloroethyl) ether, diethylene glycol mono-(2-chloroethyl) ether, triethylene glycol mono-(2-chloroethyl) ether and tetraethylene glycol mono-(2-chloroethyl) ether; dialkyl sulphates, such as dimethyl sulphate and diethyl sulphate; and esters of aliphatic and aromatic sulphonic acids, such as iso-amyl p-toluenesulphonate, n-octyl-p-toluene sulphate, the mono-methylsulphonate of glycol mono-(2-methoxyethyl) ether, tetra-ethylene glycol mono-p-toluenesulphonate and the mono-methylsulphonate of triethylene glycol monoethyl ether.

The polyethylene glycol derivatives employed for the alkylation can also consist of mixtures of homologous compounds. Thus, for example, it is possible to employ, in place of the single compound $Cl—(C_2H_4—O—)_4CH_3$, a mixture $Cl—(C_2H_4—O—)_vCH_3$, wherein the major proportion in which $v = 3, 4$ or $5$ makes up 70% and the remaining 30% are distributed between $v = 1, 2, 6, 7$ and $8$. In a corresponding manner, the abovementioned radicals $COO—(C_2H_4—O—)_mZ$ and $O—(C_2H_4—O—)_mZ$ can represent a mixture in which $m = 0-8$.

Examples of aminoazo dyestuffs of the formula (V) are: diethylene glycol mono-4-(4'-aminobenzeneazo)-phenyl ether monoethyl ether, diethylene glycol mono-4-(3'-aminobenzeneazo)-phenyl ether monomethyl ether, diethylene glycol mono-4-(4'-aminobenzeneazo)-3-methylphenyl monomethyl ether, 4'-amino-2-methoxy-5-methyl-azobenzene and the mono-4'-amino-4-hydroxyazobenzene-3-carboxylic acid ester of diethylglycol monobutyl ether.

Examples of o-nitrohalogenobenzenes of the formula (VI) are: 4-chloro-3-nitro-benzoic acid methyl ester, 4-chloro-3-nitro-benzonitrile, 1,3-dinitro-2-chlorobenzene, the 3-chloro-3-nitrobenzoate of triethylene glycol monoethyl ether, 4-chloro-3-nitrobenzenesulphonic acid N,N-diethylamide and 4-chloro-3-nitrobenzoic acid.

The diazotisation of the diazo component (III) is carried out in a manner which is in itself known.

The coupling reaction of the diazotised amines (III) with the phenols (IV) is also carried out in a customary manner, preferably in an aqueous alkaline medium.

The condensation reaction of the o-nitrohalogenobenzenes (VI) with the aminoazo dyestuffs (V) is also carried out in a manner which is in itself known, for example in an aqueous medium with the addition of organic solvents, such as alcohols or glycols, in the presence of acid-binding agents, such as magnesium oxide, calcium carbonate, alkali metal carbonates or alkali metal bicarbonates. The condensation reaction can also be carried out under anhydrous conditions, for example in glycol or glycol monomethyl ether or dimethylformamide in the presence of tertiary amines, such as, for example, tri-n-butylamine or of sodium acetate. Temperatures of between 50° and 200° C. and preferably of between 80° and 170° C. are employed for the condensation reactions.

The etherification of the azo dyestuffs of the formula (II) wherein $R_7 = $ OH with the abovementioned alkylating agents in which $(A-O)_m$-Z is alkyl is also carried out in a manner which is in itself known, for example in an aqueous-alkaline medium or in an alkaline aqueous-organic medium. Most advantageously, the reaction is carried out at temperatures of 50° to 100° C. and, if necessary, in the case of low-boiling alkylating agents (methyl chloride), the reaction is carried out in an autoclave.

The etherification of the dyestuffs of the formula (II) wherein $R_7 = $ OH with alkylene oxides is carried out in a manner which is in itself known, for example in an aqueous alkaline medium or in an alkaline aqueous organic medium or in an organic medium with the addition of alkali or basic ion exchangers. The reaction is carried out at temperatures of between 50° and 150° C. and in the case of low-boiling alkylene oxides is, if necessary, carried out in an autoclave.

The compounds of the formula (II) are suitable for dyeing and printing hydrophobic materials, especially textiles or fibres made of aromatic polyesters, such as polyethylene terephthalates and polyesters of terephthalic acid and 1,4-bishydroxymethyl-cyclohexane as well as cellulose tracetate and cellulose 2½-acetate and synthetic high molecular weight polyamides by the dyeing and printing processes customary for these types of fibre. The dyestuffs are preferably employed in the form of aqueous formulations which, in the present case, can be prepared in a particularly simple manner.

Above all, however, the new dyestuffs are suitable for dyeing polyester fibres from an aqueous liquor by the exhaustion process since they are distinguished by a good affinity and build-up power. The resulting dyeings are very clear and display good general fastness properties, such as fastness to light, sublimation and measuring.

EXAMPLE 1

27.4 g of 2-nitro-4-carboxy-4'-aminodiphenylamine are dissolved in 850 ml of water at pH 10. 75 ml of 10% strength sodium nitrite solution are added and the solution is allowed to run into a mixture of 350 g of ice and 45 ml of 30% strength hydrochloric acid in the course of 1 hour. The mixture is stirred for a further 1 hour at 5° C. and excess nitrite is destroyed with amidosulphonic acid. The suspension of the diazonium salt is added to a mixture of 9.6 g of phenol, 320 ml of 20% strength sodium carbonate solution, 270 g of ice and 380 ml of cellosolve. After the coupling reaction has ended, the dyestuff of the formula

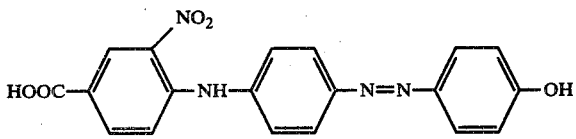

which has precipitated is filtered off and washed with 1 l of water. After drying at 50° C., 35 g of a yellow-brown powder are obtained.

EXAMPLE 2

37.8 g of 4'-(4-hydroxybenzeneazo)-2-nitro-4-carboxydiphenylamine and 68 g of triethylene glycol 2-chloroethyl monomethyl ether are stirred in 150 ml of water and 250 ml of isopropanol with 20.3 ml of 40% strength sodium hydroxide solution and 7 g of sodium carbonate for 8 hours at 100° C. in an autoclave. After cooling, the dyestuff which has precipitated is filtered off and washed with 100 ml of water. After drying at 80° C. in vacuo, 51 g of the dyestuff of the formula

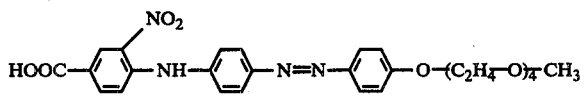

which dyes polyester fibres, from an aqueous liquor at the boiling point, reddish-tinged yellow are obtained.

If, in place of the triethylene glycol 2-chloroethyl monomethyl ether, 68 g of a mixture of the formula $Cl-(C_2H_4O)_v-CH_3$, wherein v denotes 1 (2%), 2 (12%), 3 (23%), 4 (26%), 5 (19%), 6 (12%), 7 (5%) and 8 (1%) with the increased proportions in % by weight indicated in brackets are used for the alkylation, a dyestuff which dyes polyester fibres, by the dyeing process described, golden yellow with good fastness properties is again obtained.

EXAMPLE 3

30 g of 2-nitro-5-chloro-4'-aminodiphenylamine hydrochloride are diazotised in 1,400 ml of water and 55 ml of 36% strength hydrochloric acid with 75 ml of 10% strength sodium nitrite solution at 20° C. The mixture is stirred for a further 1 hour and the excess nitrite is destroyed with amidosulphonic acid. 28.2 g of O-n-butyl-0'-salicoyl-diethylene glycol are added to the clarified solution and the mixture is buffered to pH 7. The dyestuff which has precipitated is filtered off, washed with 200 ml of water and dried in vacuo at 70° C. The coupling product of the formula

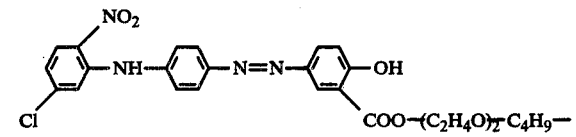

dyes polyester fibres in reddish-tinged yellow shades with good fastness properties.

EXAMPLE 4

22.9 g of 2-nitro-4'-aminodiphenylamine are diazotised in 100 ml of water and 55 ml of 36% strength hydrochloric acid with 76 ml of 10% strength sodium nitrite solution at 20° C. The mixture is stirred for a further 1 hour and the excess nitrite is destroyed with amidosulphonic acid. 9.5 g of phenol are added to the clarified solution and the mixture is buffered to pH 7 with 20% strength sodium carbonate solution. The dyestuff which has precipitated is filtered off, washed with 500 ml of water and dried in vacuo at 50°. 29.7 g of a brown-yellow product of the formula

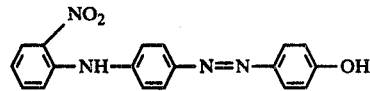

are obtained.

EXAMPLE 5

29.7 g of 2-nitro-4'-(4-hydroxybenzeneazo)-diphenylamine are alkylated in 500 ml of acetone and 200 ml of water with 59.4 g of the mono-methanesulphonic acid ester of diethylene glycol monomethyl ether at 60° C. and pH 11-12. The pH is kept in the desired range by the dropwise addition of about 60 ml of 4 N sodium hydroxide solution. After the end of the reaction, some of the acetone is distilled off and the dyestuff of the formula

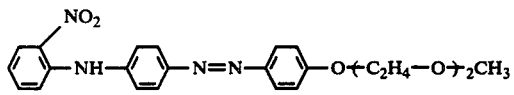

which has precipitated is filtered off and washed with 500 ml of water. After drying in vacuo at 70°, 43 g of a brown powder which dyes polyester reddish-tinged yellow with good fastness properties are obtained.

EXAMPLE 6

0.5 part of the dyestuff of the formula

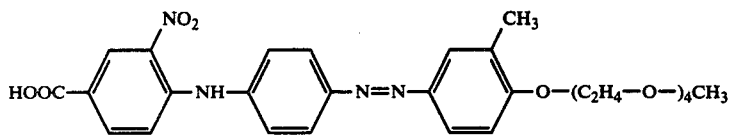

is dissolved in a bath of 500 parts of water, which contains one part of lauryl sulphate, to give a neutral solution. After adding 2 parts of 60% strength acetic acid, 50 parts of a fabric of polyester material are dyed in this liquor by heating the dyebath to 120° C., with adequate agitation of the fabric or/and sufficiently great circulation of the liquor, and dyeing for 1 hour at this temperature. The fabric is then rinsed and dried. A golden yellow dyeing with good light and fastness to sublimation is obtained.

If the procedure indicated in Examples 1 to 5 is followed using the corresponding diazo components (III), coupling components (IV) and alkylating agents or the corresponding o-halogenonitro compounds (VI) and aminoazo compounds (V), the dyestuffs of the formula

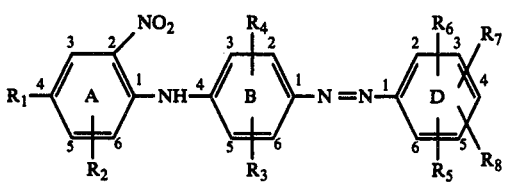

wherein $R_1$ to $R_8$ have the same meaning as in formula (II), which are listed in Table 1 which follows are obtained. The index numbers indicated at the front in the columns of Table 1 correspond to formula (VII).

Table 1

| Example No. | R₁ | R₂ | R₃ | R₄ | R₅ | R₆ | R₇ | R₈ | Colour shade on polyester |
|---|---|---|---|---|---|---|---|---|---|
| 7 | COOH | H | H | H | H | H | 4-O-(C₂H₄—O₂)—C₂H₅ | H | reddish-tinged yellow |
| 8 | COOH | H | H | H | H | H | 2-O-(C₂H₄—O)₃CH₃ | H | reddish-tinged yellow |
| 9 | COO—(C₂H₄—O)₆CH₃ | H | H | H | H | 2-CH₃ | 4-OH | H | reddish-tinged yellow |
| 10 | " | H | H | H | H | 3-tert.-C₄H₉ | 4-OH | H | reddish-tinged yellow |
| 11 | COO—(C₂H₄—O)₂CH₃ | H | H | H | 2-CH₃ | 5-CH₃ | 4-OH | H | reddish-tinged yellow |
| 12 | " | H | 2-OCH₃ | H | H | H | 4-O—(C₂H₄—O)₃CH₃ | H | reddish-tinged yellow |
| 13 | " | H | H | H | 2-OCH₃ | H | 4-OH | H | orange |
| 14 | " | H | 2-CH₃ | H | 3-Cl | H | 4-OH | H | orange |
| 15 | " | H | H | H | 3-OCH₃ | H | 4-OH | H | orange |
| 16 | COO—(C₂H₄—O)₄H / COO—C₂H₄—O)₂H | H | H | H | H | 3-CH₃ | 4-OH | H | reddish-tinged yellow |
| 17 | HOOC—⟨C₆H₄⟩—SO₂—NH— | H | H | H | H | 2-CH₃ | 4-O—(C₂H₄—O)₄H | H | reddish-tinged yellow |
| 18 | CH₃OOC—⟨C₆H₄⟩—SO₂—O— | H | H | H | H | H | 4-O—(C₂H₄—O)₃C₂H₅ | H | reddish-tinged yellow |
| 19 | H | H | H | H | H | 2-CH₃ | 4-O—(C₂H₄—O)₃H | H | reddish-tinged yellow |
| 20 | CN | 5-Cl | H | H | H | H | 4-O—(C₂H₄—O)₅H | H | reddish-tinged yellow |
| 21 | NO₂ | H | H | H | H | 3-CH₃ | 4-O—(C₂H₄—O)₄H | H | reddish-tinged yellow |
| 22 | CO—C₄H₉ | H | 2-OCH₃ | H | H | 5-CH₃ | 2-O—(C₂H₄—O)₃C₂H₅ | H | reddish-tinged yellow |
| 23 | SO₂—CH₂—C₆H₅ | H | H | H | H | H | 4-OH | 3-COO—(C₂H₄—O)₆CH₃ | orange |
| 24 | SO₂—CH₂—CH—OH | H | 2-CH₃ | H | H | H | 4-OH | 3-COO—(C₂H₄—O—)₂— C₂H₅ | orange |
| 25 | CO—NH—C₄H₉ | H | H | H | H | H | 4-O—(C₂H₄—O—)₄H | H | reddish-tinged yellow |
| 26 | CO—N(—C₃H₇)₂ | H | H | H | H | H | 4-O—(C₂H₄—O)₃H | H | reddish-tinged yellow |
| 27 | CO—N(—CH₃)—C₂H₄—C₆H₅ | H | H | H | H | 2-CH₃ | 4-O—(C₂H₄—O)₄H | H | reddish-tinged yellow |
| 28 | CO—N(—CH₃)—C₆H₅ | H | H | H | H | 3-CH₃ | 4-O—(C₂H₄—O)₅H | H | reddish-tinged yellow |
| 29 | CO—N(—C₂H₄—CN)₂ | H | H | H | H | H | 2-OH | 5-COO—(C₂H₄—O)₂— C₂H₅ | orange |

Table 1-continued

| Example No. | $R_1$ | $R_2$ | $R_3$ | $R_4$ | $R_5$ | $R_6$ | $R_7$ | $R_8$ | Colour shade on polyester |
|---|---|---|---|---|---|---|---|---|---|
| 30 | H | 6-$NO_2$ | H | H | H | H | 4-OH | 2-COO—$(C_2H_4$—O—$)_4CH_3$ | orange |
| 31 | COO—$C_3H_7$ | H | H | H | H | H | 4-O—$(C_2H_4$—O—$)_2C_2H_5$ | H | reddish-tinged yellow |
| 32 | COO—$C_2H_4$—$OCH_3$ | H | H | H | H | H | " | H | reddish-tinged yellow |
| 33 | COO—$C_2H_4$—OH | H | 2-Cl | H | 3-Cl | H | " | H | orange |
| 34 | COO—$C_6H_5$ | H | H | H | H | H | " | H | reddish-tinged yellow |
| 35 | ![cyclohexyl-COO-]  H | H | H | H | H | H | 4-O—$(C_2H_4$—O—$)_3$H | H | reddish-tinged yellow |
| 36 | COO—$(C_2H_4$—O—$)_3C_2H_5$ | H | H | H | H | 5-$CH_3$ | 2-$OCH_3$ | H | reddish-tinged yellow |
| 37 | $SO_2$—N(—$C_2H_4$)$_2$ | H | H | H | H | H | 4-OH | 3-COO—$(C_2H_4$—O—$)_2$$C_4H_9$ | reddish-tinged yellow |

EXAMPLE 38

28.7 g of 2-nitro-4-methoxycarbonyl-3'-aminodiphenylamine are diazotised in 1,000 ml of water and 70 ml of 30% strength hydrochloric acid with 80 ml of 10% sodium nitrite solution at 20° C. The mixture is stirred for a further 1 hour and the excess nitrite is destroyed by amidosulphonic acid. After clarification, the diazonium salt solution is added to a mixture of 10.8 g of m-cresol, 400 ml of cellosolve, 360 ml of 20% strength sodium carbonate solution and 360 ml of water and the coupling reaction is carried out at 20° C. The dyestuff of the formula

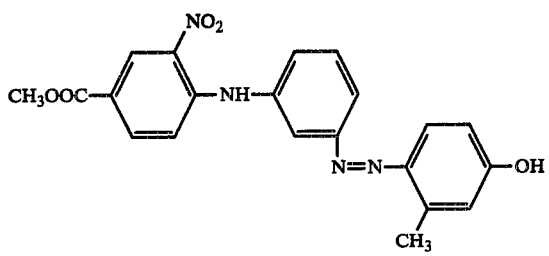

which has precipitated is filtered out and washed with 1 l of water. After drying at 50° C., 37 g of the product are obtained.

EXAMPLE 39

40.6 g of 3'-(2-methyl-4-hydroxybenzeneazo)-2-nitro-4-methoxy-carbonyldiphenylamine are warmed in 500 ml of acetone and 200 ml of water with 81.6 g of the mono-methanesulphonic acid ester of tetraethylene glycol to 60° C. Whilst stirring, the pH is maintained at 10–11 by the dropwise addition of 52 ml of 4 N sodium hydroxide solution. After the alkylation has ended, the bulk of the acetone is distilled off and the dyestuff of the formula

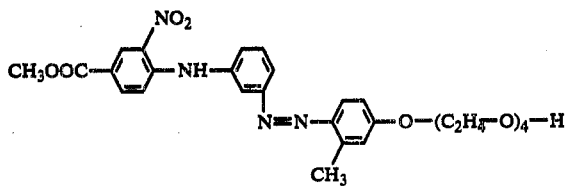

which has precipitated is filtered off and washed with 200 ml of water. By drying in vacuo at 70° C., 51 g of the dyestuff, which dyes polyester with good fastness properties, are obtained.

The dyestuffs of the formula

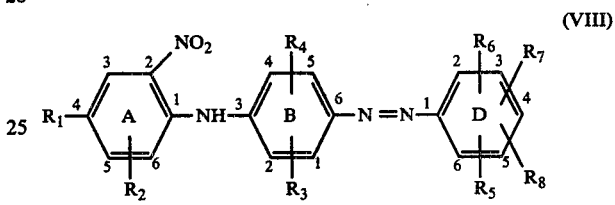

(VIII)

which are listed in the table which follows are obtained correspondingly. The index numbers indicated at the front in the columns of the table correspond to this formula. The substituents $R_1$ to $R_8$ have the same meaning as in formula (II).

Table 2

| Example No. | $R_1$ | $R_2$ | $R_3$ | $R_4$ | $R_5$ | $R_6$ | $R_7$ | $R_8$ | Colour shade on polyester |
|---|---|---|---|---|---|---|---|---|---|
| 40 | H | 5-Cl | H | H | H | H | 4-OH | 3-COO—$(C_2H_4)_2C_4H_9$ | yellow |
| 41 | H | 5-Cl | H | 6-$CH_3$ | H | H | 2-OH | 5-COO—$(C_2H_4$—O—$)_2C_2H_5$ | yellow |
| 42 | CO—$C_6H_5$ | H | 6-O—$CH_3$ | H | H | H | 4-O—$(C_2H_4$—O—$)_4$H | H | yellow |
| 43 | ![piperidine] CO—N | H | 6-O—$CH_3$ | H | H | H | 4-O—$(C_2H_4$—O—$)_6CH_3$ | H | yellow |
| 44 | COO$C_6H_{13}$ | H | H | H | H | 2-$CH_3$ | 4-O—$(C_2H_4$—O—$)_3$H | H | yellow |
| 45 | COO—$(C_2H_4$—O—$)_4$ ![cyclohexyl] | H | H | H | H | 5-![cyclohexyl]H | 2-OH | H | |
| 46 | $CH_3$ | H | H | H | H | 3-$CH_3$ | 4-O—$(C_2H_4$—O—$)_4CH_3$ | H | yellow |
| 47 | COOH | H | H | H | H | H | 4-O—$(C_2H_4$—O—$)_4$H | H | yellow |
| 48 | COOH | H | H | H | H | 5-$CH_3$ | 2-O—$(C_2H_4$—O—$)_6CH_3$ | H | yellow |
| 49 | COO$C_6H_5$ | H | H | H | H | H | 4-O—$(C_2H_4$—O—$)_4$H | H | yellow |
| 50 | COO$CH_3$ | H | H | H | H | H | 4-O—$(C_2H_5$—O$)_5CH_3$ | H | yellow |
| 51 | $NO_2$ | H | H | H | H | H | 4-OH | 3-COO—$(C_2H_4$—O—$)_2C_4H_9$ | yellow |

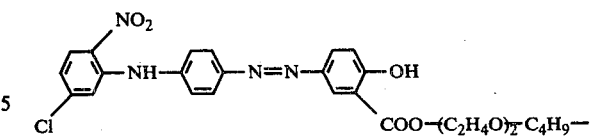

We claim:

1. Azo dyestuffs which are free from sulphonic acid groups and of the formula

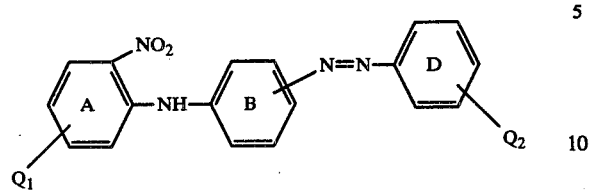

wherein $Q_1$ and $Q_2$ independently of one another represent hydrogen or the group $V\text{-}(A\text{-}O)_n Z$, but do not at the same time represent hydrogen, A denotes an alkylene group, V denotes a direct bond or a bridge member, Z denotes hydrogen, alkyl, aryl, aralkyl or acyl and n denotes an integer from 2–10 and the rings A, B and D can contain further non-ionic substituents customary in azo dyestuff chemistry, and the azo group is in the m-position or p-position to the secondary amino group on ring B.

2. Azo dyestuffs according to claim 1, of the formula

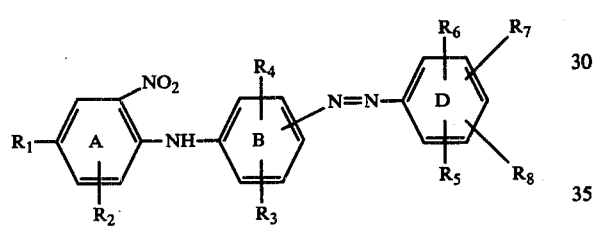

wherein $R_1$ represents H, $NO_2$, CN, halogen, alkyl, $COX_1$, $SO_2X_2$, $CONX_3X_4$, $SO_2\text{-}NRX_3X_4$, COOZ, SCN, $OX_1$, $SX_1$ or $V\text{-}(A\text{-}O\text{-})_m Z$, $R_2$ represents H, $NO_2$, halogen, alkyl, O-alkyl or aryl, $R_3$, $R_4$ and $R_5$ independently of one another represent H, alkyl, O-alkyl or halogen, $R_6$ represents H, alkyl, aryl or cycloalkyl, $R_7$ represents H, $V\text{-}(A\text{-}O\text{-})_m Z$ or V-Z and $R_8$ represents H, $V\text{-}(A\text{-}O\text{-})_m Z$ or V-Z and $X_1$ denotes alkyl or aryl, $X_2$ denotes alkyl, aryl or aralkyl, $X_3$ and $X_4$ independently of one another denote H, alkyl, aryl or cycloalkyl, or, conjointly with the N atom, form a 5-membered to 7-membered saturated heterocyclic structure and Z denotes H, alkyl, aryl, aralkyl or cycloalkyl, m denotes an integer 2–8 and V and A have the meaning indicated in claim 1 and the abovementioned alkyl, aryl, aralkyl or cycloalkyl radicals can contain further non-ionic substituents customary in dyestuff chemistry, with the proviso that the azo group is in the m-position or o-position relative to the secondary amino group on ring B and that at least one of the radicals $R_1$, $R_7$ and $R_8$ independently of one another represent the radical $V\text{-}(A\text{-}O\text{-})_m Z$.

3. Azo dyestuffs according to claim 2, wherein $R_1$ represents $COO\text{—}(C_2H_4\text{—}O\text{—})_m Z$ or COOZ, $R_2$ represents H, halogen or alkyl, $R_3$ and $R_8$ represent H, $R_4$ and $R_5$ independently of one another represent H, alkyl, O-alkyl or halogen, $R_6$ represents H, alkyl, aryl or cycloalkyl and $R_7$ represents $O\text{—}(C_2H_4\text{—}O\text{—})_m Z$ or V-Z and Z denotes H, alkyl, aryl, aralkyl or cycloalkyl and m has the meaning indicated in claim 2 with the proviso that the azo group is in the m-position or p-position on ring B relative to the secondary amino group and the radical $R_7$ is in the o-position or p-position relative to the azo group and that at least one of the radicals $R_1$ and $R_7$ contains the group $(C_2H_4O)_m$.

4. Azo dyestuffs according to claim 2, wherein $R_1$ represents $COO\text{—}(C_2H_4\text{—}O\text{—})_m Z$ or COOZ, $R_2$ represents H, chlorine or $C_1$–$C_4$-alkyl, $R_3$ and $R_8$ represent H, $R_4$ and $R_5$ independently of one another represent H, $C_1$–$C_4$-alkyl, $C_1$–$C_4$-alkoxy or chlorine, $R_6$ represents H, $C_1$–$C_4$-alkyl, phenyl, tolyl or cyclohexyl, $R_7$ represents $O\text{—}(C_2H_4\text{—}O\text{—})_m Z$ or O-Z, m has the meaning indicated in claim 2 and Z denotes H, phenyl, phenyl-$C_1$–$C_4$-alkyl, tolyl, cyclohexyl, $C_1$–$C_8$-aryl or $C_1$–$C_8$-alkyl which is substituted by hydroxyl or phenyl, or the radical of the formula $$-CH_2-\underset{OR_9}{\underset{|}{CH}}-R_{10}$$

in which $R_9$ denotes H, $C_1$–$C_4$-alkyl, $C_1$–$C_4$-alkoxycarbonyl or benzoyl and $R_{10}$ denotes H or $C_1$–$C_4$-alkyl, with the proviso that the azo group is in the m-position or p-position on ring B relative to the secondary amino group, that the radical $R_7$ is in the o-position or p-position relative to the azo group and that at least one of the radicals $R_1$ and $R_7$ contains the group $(C_2H_4O)_m$.

5. Azo dyestuffs according to claim 2, wherein $R_1$ represents H, $NO_2$ or CN, $R_2$ represents halogen (preferably chlorine), $NO_2$ or $C_1$–$C_4$-alkoxy, $R_7$ represents $O\text{—}(C_2H_4\text{—}O\text{—})_m Z$ or O-Z, $R_8$ represents $COO\text{—}(C_2H_4\text{—}O\text{—})_m Z$ or COOZ and the other radicals and m have the meaning indicated in claim 2, with the proviso that the azo group is in the m-position or p-position on ring B relative to the secondary amino group and that at least one of the radicals $R_7$ and $R_8$ contains the group $(C_2H_4O)_m$.

6. Azo dyestuff according to claim 1, of the formula

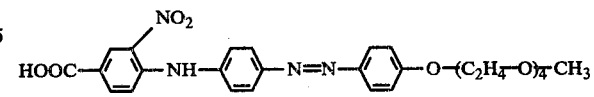

7. Azo dyestuff according to claim 1, of the formula